United States Patent Office 2,811,463
Patented Oct. 29, 1957

2,811,463

INORGANIC BLACK PIGMENT

Aladar Burgyan, Cleveland, Ohio, assignor to Ferro Corporation, Cleveland, Ohio, a corporation of Ohio No Drawing. Application December 23, 1955,
Serial No. 555,199

7 Claims. (Cl. 106—304)

This invention relates as indicated to an inorganic black pigment and has more particular reference to an improved pigment possessing unusual tinting strength and hiding power.

Prior art inorganic black pigments such as disclosed in U. S. Patents 2,248,021, 2,309,173 and 2,416,064 generally contain the oxides of chromium. While the prior art blacks generally are suitable for coloring porcelain enamels or ceramics they have been found to have insufficient tinting strength and hiding power for coloring materials such as roofing granules, concrete building blocks, cements, plastics, etc.

Therefore, it is the principal object of this invention to provide a new black pigment which is far superior to prior art blacks in tinting strength and hiding power.

It is a further object of this invention to provide a black pigment which is substantially free of chromium which comprises a manganese, copper and iron pigment, by an improved method of manufacture.

Another object of this invention is to provide an improved black inorganic pigment adapted for imparting color to roofing granules, concrete blocks, cements, other building materials, plastics, and other synthetic materials.

Other objects will appear as the description proceeds.

To the accomplishment of the foregoing and related ends, said invention, then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention comprises a new black inorganic pigment consisting essentially of the oxides of Mn, Cu and Fe produced by the co-calcination of those compounds of said metals which yield their oxides during calcination.

While the pigment of the present invention can be made by directly calcining the oxides or those compounds of manganese, copper and iron which yield their oxides upon calcination I prefer to first coprecipitate and then calcine. However, in either case the batch composition of the pigment of this invention is calculated on the basis that the finally calcined product comprises from 20 to 80 parts by weight of MnO, from 20 to 80 parts by weight of CuO and from 5 to 50 parts by weight of FeO.

As stated above I prefer to coprecipitate the metals in producing the present pigment. In this method I use the water soluble salts of Mn, Cu and Fe such as chlorides, nitrates, sulfates or other water soluble compounds. The metals are put into solution and the solution struck with a hydroxide. For best results during the strike the precipitate should be stirred, this can be done either by conventional mechanical means or by air-bubbling. I have found that a slight excess of hydroxide produces the best results, about 1.1 times the stoichiometric quantity is preferred. The hydroxides can be any alkali metal, alkaline earth metal, or ammonium hydroxide. I prefer the use of sodium or potassium hydroxide. The resulting coprecipitate is then filtered, washed, dried and then calcined at temperatures of from about 800° F. to about 1400° F., the preferred range being from 1000° F. to 1200° F.

As examples of my improved inorganic black pigments of superior hiding power and tinting strength, and the best method by which those pigments may be prepared, the following examples are presented:

*Example I*

40 lbs. of manganese sulfate, technical grade, containing 79% MnSO$_4$, 40 lbs. of blue vitriol (CuSO$_4$·5H$_2$O) and 20 lbs. of copperas (FeSO$_4$·7H$_2$O) were dissolved in about 200 lbs. of water. This solution was struck with a 1:1 solution of 50 lbs. caustic soda, containing 76% NaOH. The resultant precipitate was filtered, washed, dried and then calcined at 1000° F. for two hours in an electric kiln.

The finished pigment was non-dusting had a deep-black mass tone and bluish-black undertone and had outstanding tinctorial power.

*Example II*

35 lbs. of manganese sulfate, technical grade, containing about 79% MnSO$_4$, 35 lbs. of blue vitriol (CuSO$_4$·5H$_2$O) and 30 lbs. of copperas (FeSO$_4$·7H$_2$O) were dissolved in about 200 lbs. of water. While air was bubbled through the solution, the solution was struck with a 1:1 solution of 50 lbs. of caustic soda, containing 76% NaOH. The resultant precipitate was filtered, washed, dried and then calcined at 1000° F. for two hours.

The resultant pigment was non-dusting and had great hiding power and tinting strength.

It should be noted that I deliberately omit the use of chromium in my pigments. I have found that chromium actually decreases the tinctorial power of my black pigments.

All of the black pigments of this invention are from 3–10 times as strong as those pigments produced by prior art disclosures. The strength of the pigments was determined by admixing 95 grams of white cement with 5 grams of pigment and then pulverizing the admixture. By comparing pigments of this invention with prior art pigments, in this manner, it can be readily demonstrated that my pigments are far superior.

Thus for the first time, there has been provided inorganic black pigments which are substantially chromium free, which pigments consist essentially of Mn, Cu and Fe and which pigments are non-dusting and have outstanding strength, deep-black mass-tone and relatively high heat stability (up to 1500° F.) and which pigments are eminently suited for coloring roofing granules, concrete blocks, cements, other building materials, plastics and other synthetic materials.

A pigment made in accordance with Example I above was used in the amount of 2% in producing black pigmented concrete blocks. It was necessary to use 5% of a prior art pigment to produce the same degree of blackness.

Further, my inorganic black pigments are of such high tinctorial power that they in many instances will be found to be capable of replacing carbon-blacks or lamp-blacks as a pigmenting material.

Other modes of applying the principle of the invention may be employed, change being made as regards to the details described, provided the features stated in any of the following claims or the equivalent of such, be employed.

I, therefore, particularly point out and claim as my invention:

1. As a new inorganic black pigment consisting essentially of substantially black oxides of Mn, Cu and Fe the calcination product of an admixture of from about 20 to 80 parts by weight of those compounds of Mn which yield their oxides on calcination, from about 20 to 80 parts by weight of those compounds of Cu which yield their oxides on calcination and from about 5 to 50 parts by weight of those compounds of Fe which yield their oxides on calcination, said admixture calcined at a temperature of from about 800° F. to 1400° F.

2. As a new inorganic black pigment consisting essentially of substantially black oxides of Mn, Cu and Fe the calcination product of an admixture of from about 20 to 80 parts, by weight of $MnSO_4$, from about 20 to 80 parts by weight of $CuSO_4$ and from about 5 to 50 parts by weight of $FeSO_4$, said admixture calcined at a temperature of from about 800° F. to 1400° F.

3. As a new inorganic black pigment consisting essentially of substantially black oxides of Mn, Cu and Fe, the calcination product of an admixture of from about 20 to 80 parts by weight of manganese oxide, from about 20 to 80 parts by weight of copper oxide and from about 5 to 50 parts by weight of iron oxide, said admixture calcined at a temperature of from about 800° F. to 1400° F.

4. A process for preparing a new inorganic black pigment which consists essentially of the oxides of Mn, Cu and Fe which comprises heating to a temperature of from about 800° F. to 1400° F. an admixture of from about 20 to 80 parts by weight of those compounds of Mn which yield their oxides on calcination, from about 20 to 80 parts by weight of those compounds of Cu which yield their oxides on calcination and from about 5 to 50 parts by weight of those compounds of iron which yields their oxides on calcination, said temperature being maintained for a sufficient time to convert said compounds to substantially black oxides of the respective metals.

5. A process for preparing a new inorganic black pigment which consists essentially of the oxides of Mn, Cu and Fe which comprises making a solution of from about 20 to 80 parts by weight of a water soluble compound of Mn, from about 28 to 80 parts by weight of a water soluble compound of Cu and from about 5 to 50 parts by weight of a water soluble compound of Fe, co-precipitating said solution with a water solution of a material selected from the class consisting of the alkali metal hydroxides, alkaline earth metal hydroxides and ammonium hydroxide, and then calcining said co-precipitate at from about 800° F. to about 1400° F. said temperature being maintained for a sufficient time to convert said compounds to substantially black oxides of the respective metals.

6. A process for preparing a new inorganic black pigment which consists essentially of the oxides of Mn, Cu and Fe which comprises making a water solution of from about 20 to 80 parts by weight of $MnSO_4$, from about 20 to 80 parts by weight of $CuSO_4$ and from about 5 to 50 parts by weight of $FeSO_4$, co-precipitating said solution with a solution of caustic soda, said caustic soda being in slight excess to the stoichiometric quantity necessary, and calcining said co-precipitate at from about 800° F. to about 1400° F. said temperature being maintained for a sufficient time to convert said compounds to substantially black oxides of the respective metals.

7. An article of manufacture comprising concrete building blocks pigmented with the composition of claim 1.

References Cited in the file of this patent

UNITED STATES PATENTS

| | | |
|---|---|---|
| 343,183 | Mathey | June 8, 1886 |
| 767,894 | Kaufmann | Aug. 16, 1904 |
| 2,248,021 | Geary | July 1, 1941 |
| 2,264,749 | Geary | Dec. 2, 1941 |
| 2,309,173 | Diehl | Jan. 20, 1943 |

FOREIGN PATENTS

| | | |
|---|---|---|
| 897,080 | Canada | Aug. 25, 1908 |
| 384,473 | Great Britain | Dec. 8, 1932 |